United States Patent
Kwon et al.

(10) Patent No.: US 7,954,450 B2
(45) Date of Patent: Jun. 7, 2011

(54) OPTICAL FIBER COATING APPARATUS FOR PREVENTING GENERATION OF BUBBLE IN COATING LAYER OF OPTICAL FIBER AND METHOD OF COATING OPTICAL FIBER USING THE SAME

(75) Inventors: Young-Il Kwon, Seoul (KR); Young-Gyu Yang, Gyeonggi-do (KR); Sang-Joon Bae, Gyeonggi-do (KR); Dong-Young Kim, Seoul (KR); Jong-Pil Kim, Gyeongsangbuk-do (KR)

(73) Assignee: LS Cable Ltd., Seoul (KR)

( * ) Notice: Subject to any disclaimer, the term of this patent is extended or adjusted under 35 U.S.C. 154(b) by 1119 days.

(21) Appl. No.: 11/662,911

(22) PCT Filed: Jun. 30, 2005

(86) PCT No.: PCT/KR2005/002082
§ 371 (c)(1),
(2), (4) Date: Mar. 14, 2007

(87) PCT Pub. No.: WO2006/031013
PCT Pub. Date: Mar. 23, 2006

(65) Prior Publication Data
US 2007/0286950 A1   Dec. 13, 2007

(30) Foreign Application Priority Data
Sep. 15, 2004 (KR) .................. 10-2004-0073938

(51) Int. Cl.
B05C 3/00 (2006.01)
B05C 3/12 (2006.01)

(52) U.S. Cl. ............... 118/405; 118/420; 118/419
(58) Field of Classification Search .......... 118/420, 118/405, 419, 62, 63; 425/113, 114; 156/180, 156/242; 264/172.15, 172.16, 280; 65/432, 65/529, 443, 474; 427/163.2
See application file for complete search history.

(56) References Cited

U.S. PATENT DOCUMENTS

| 4,512,281 | A | | 4/1985 | Yamanishi | |
| 5,377,491 | A | | 1/1995 | Schulte | |
| 5,383,946 | A | * | 1/1995 | Naka et al. | 65/443 |
| 5,588,997 | A | | 12/1996 | Lysson | |
| 5,974,837 | A | | 11/1999 | Abbott | |
| 5,976,253 | A | | 11/1999 | Rosenkranz | |
| 5,976,611 | A | * | 11/1999 | Okuno et al. | 427/8 |
| 6,383,293 | B1 | * | 5/2002 | Gao et al. | 118/420 |

FOREIGN PATENT DOCUMENTS
JP   61-151033   7/1986
* cited by examiner

Primary Examiner — Yewebdar T Tadesse
(74) Attorney, Agent, or Firm — Jones Day

(57) ABSTRACT

Disclosed is an optical fiber coating apparatus for preventing generation of bubble in a coating layer of an optical fiber when the optical fiber is coated, which includes a coating unit for allowing an optical fiber to pass through and forming a coating layer on the optical fiber; a base coupled with a lower portion of the coating unit to draw the optical fiber; a cover installed to an upper portion of the coating unit to isolate the coating unit from an external air and having an optical fiber introduction hole; a gas supply line for supplying gas, having smaller kinetic viscosity than the air, into an inner space formed by the cover; and a coating agent discharge line for discharging a coating agent remained in the inner space of the cover. The inner space forms positive pressure circumstance by using the gas having smaller kinetic viscosity than the air.

9 Claims, 3 Drawing Sheets

[Fig. 1]
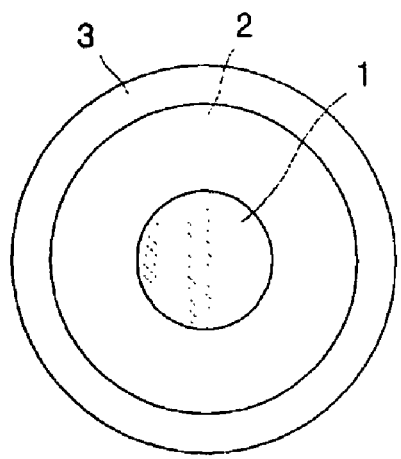
[Fig. 2]
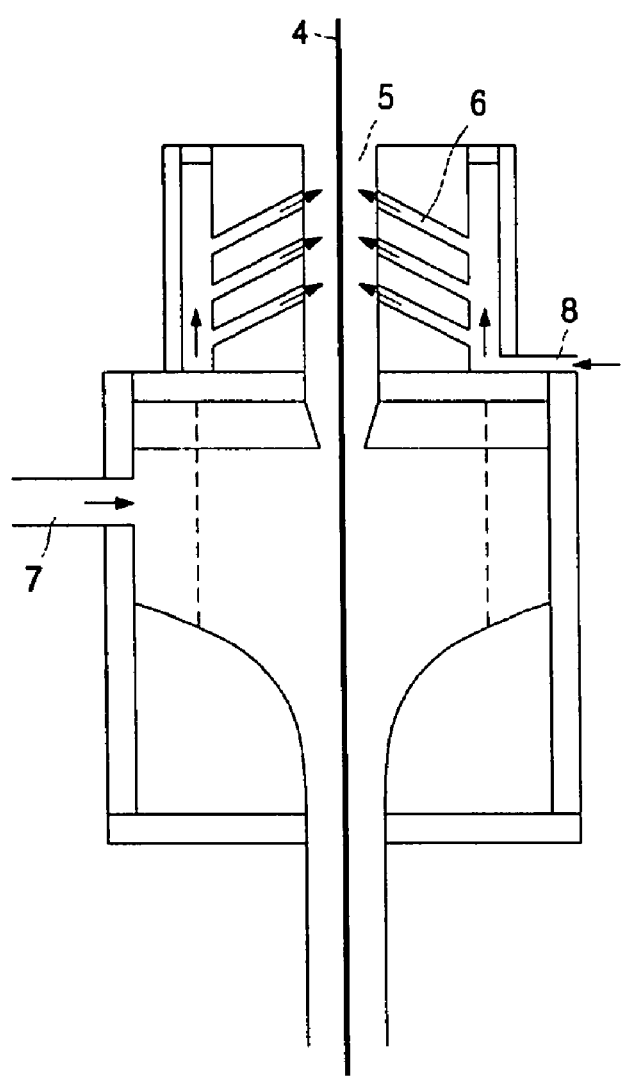

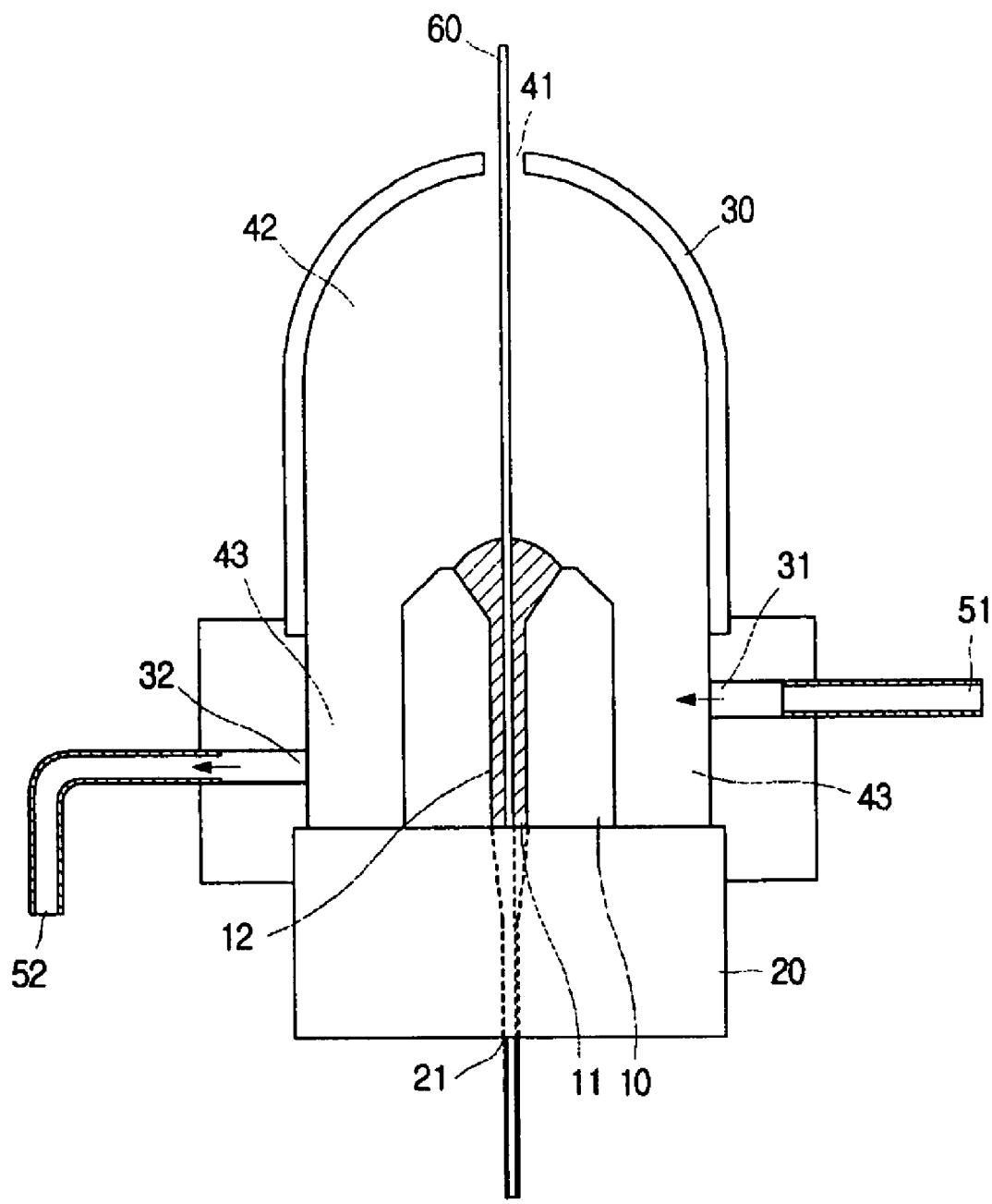
[Fig. 3]

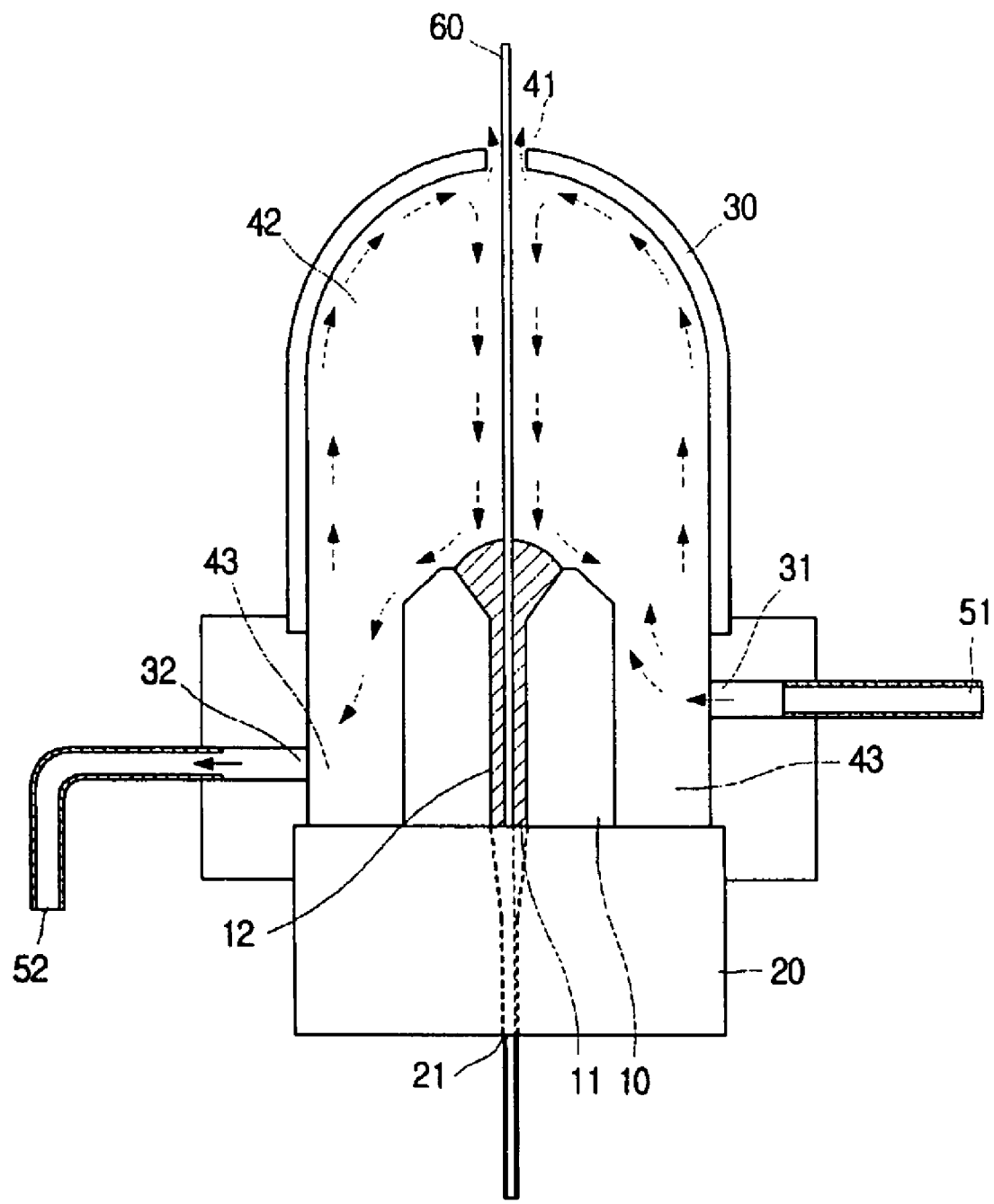
[Fig. 4]

OPTICAL FIBER COATING APPARATUS FOR PREVENTING GENERATION OF BUBBLE IN COATING LAYER OF OPTICAL FIBER AND METHOD OF COATING OPTICAL FIBER USING THE SAME

TECHNICAL FIELD

The present invention relates to an optical fiber coating apparatus and method, and more particularly to an optical fiber coating apparatus and method for preventing generation of bubble in a coating layer of an optical fiber when the optical fiber is coated.

BACKGROUND ART

Generally, an optical fiber is manufactured by coating a preform, fabricated by IVPO (Inside Vapor Phase Oxidization) or OVD (Outside Vapor Deposition), with a heating furnace to make its end into a melted state, and then cooling, coating and hardening the preform with drawing the melted portion to a very small diameter.

FIG. 1 shows an optical fiber manufactured as mentioned above. Referring to FIG. 1, the optical fiber includes a core layer 1 for propagating optical signals, a clad layer 2 surrounding the core layer 1 and having a relatively lower refractive index than the core layer 1, and a coating layer 3.

The coating layer 3 protects the optical fiber composed of the core layer 1 and the clad layer 2 from external impacts, and it is formed by coating a coating agent on the surface of the optical fiber being drawn.

However, if a drawing speed of the optical fiber is increased to reduce manufacture costs of the optical fiber, an external air is introduced into the coating unit along the surface of the optical fiber during the optical fiber coating process, and the air does not come out but remains therein as a bubble, which causes deteriorated quality and disconnection of the optical fiber. As the drawing speed is increased, thickness of a boundary layer of the external air introduced into the coating agent along the surface of the optical fiber is increased on the surface of the optical fiber. In this case, stable meniscus form generated when the optical fiber comes in contact with the coating layer is broken, resulting such inferior quality and disconnection.

FIG. 2 shows a conventional coating device, directed to solving the above problem. Referring to FIG. 2, the conventional coating device forms a coating layer by coating a coating agent, introduced through a coating agent inlet 7 formed in one internal side of the coating device, onto the surface of an optical fiber 4 introduced through an introduction passage 5. During such a coating process, before the coating agent is coated on the surface of the optical fiber 4, the coating device sprays gas, which has lower kinetic viscosity than the air introduced into the coating device through a gas inlet 8, on the surface of the optical fiber 4 through nozzles 6 provided to both sides of the introduction passage 5. Since the gas is sprayed, thickness of a boundary layer formed on the optical fiber surface by an external air is decreased. In addition, since the boundary layer is formed on the surface of the optical fiber 4 by the gas having smaller kinetic viscosity than air, the thickness of the boundary layer of the external air that causes generation of bubbles may be reduced though a drawing speed of the optical fiber is increased.

However, since the conventional coating device sprays gas directly to the surface of the optical fiber, the optical fiber being introduced into the coating device is finely vibrated. Accordingly, it may cause change of diameter and deteriorated coating quality of the optical fiber being drawn. This problem is worse in a process circumstance where pressure and amount of gas should be increased as a drawing speed of the optical fiber is increased.

DISCLOSURE OF INVENTION

Technical Problem

The present invention is designed in consideration of the above problems, and therefore it is an object of the invention to provide an optical fiber coating apparatus that may prevent generation of bubble in a coating layer of an optical fiber by minimizing an external air introduced into the coating device along the surface of the drawn optical fiber and also form a coating layer by stabilizing coating conditions of an optical fiber drawn at a high speed, and also to provide an optical fiber coating method using the apparatus.

Technical Solution

In order to accomplish the above object, the present invention provides an optical fiber coating apparatus, which includes a coating unit for allowing an optical fiber to pass through and forming a coating layer on the optical fiber; a base coupled with a lower portion of the coating unit to draw the optical fiber; a cover installed to an upper portion of the coating unit to isolate the coating unit from an external air, the cover having an optical fiber introduction hole; a gas supply line for supplying gas, having smaller kinetic viscosity than the air, into an inner space formed by the cover; and a coating agent discharge line for discharging out a coating agent remained in the inner space of the cover, wherein the inner space forms positive pressure circumstance by using the gas having smaller kinetic viscosity than the air.

Preferably, in the optical fiber coating apparatus according to the present invention, the gas supply line and the coating agent discharge line are connected to the cover.

In the optical fiber coating apparatus according to the present invention, the gas introduced into the inner space of the cover is preferably not directly sprayed on a surface of the optical fiber.

In the optical fiber coating apparatus according to the present invention, it is preferred that the gas supply line is connected to a lower portion of the cover so that the gas supplied through the gas supply line equally divides its pressure through a pressure equal division space formed around the coating unit, and then the inner space is filled with the gas.

In the optical fiber coating apparatus according to the present invention, the gas is preferably Freon, xenon, carbon dioxide, or their mixtures.

In the optical fiber coating apparatus according to the present invention, the cover is preferably made of transparent material so that the optical fiber introduced into the inner space of the cover is observable from outside, and the transparent material is preferably glass or transparent plastic.

In the optical fiber coating apparatus according to the present invention, the coating agent discharge line is preferably connected to the cover at a relatively lower position than the gas supply line so as not to disturb gas supply into the inner space of the cover.

The optical fiber coating apparatus according to the present invention may further include a vacuum means connected to the coating agent discharge line so as to improve a coating agent discharging force.

In another aspect of the invention, there is also provided an optical fiber coating method using an optical fiber coating apparatus including a coating unit for allowing an optical fiber to pass through and forming a coating layer on the optical fiber, and a cover having an optical fiber introduction hole and installed to an upper portion of the coating unit to isolate the coating unit from an external air, wherein the method includes supplying gas, having smaller kinetic viscosity than the air, into an inner space formed by the cover through a gas supply line connected to the cover; and introducing an optical fiber through the optical fiber introduction hole and allowing the optical fiber to pass through a through hole filled with a coating agent.

In the optical fiber coating method according to the present invention, it is preferred that the gas introduced through the gas supply line connected to the lower portion of the cover equally divides its pressure through a pressure equal division space formed around the coating unit and then fills the inner space.

In the optical fiber coating method according to the present invention, a flow rate of the gas is preferably controlled to keep the inner space formed by the cover at a positive pressure so as to intercept an external air introduced into the optical fiber introduction hole.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a sectional view showing a general optical fiber;

FIG. 2 shows configuration of a conventional optical fiber coating device;

FIG. 3 shows configuration of an optical fiber coating apparatus according to a preferred embodiment of the present invention; and FIG. 4 is a schematic view showing the process of coating an optical fiber using the optical fiber coating apparatus according to a preferred embodiment of the present invention.

BEST MODE FOR CARRYING OUT THE INVENTION

The present invention will be described in detail referring to the drawings. The terms used should not be construed as limited to general and dictionary meanings but based on the meanings and concepts of the invention on the basis of the principle that the inventor is allowed to define terms appropriate for the best explanation. Therefore, the description herein the scope of the invention be understood that other and modifications could be made thereto without departing from the spirit and scope of the invention.

FIG. 3 shows configuration of an optical fiber coating apparatus according to a preferred embodiment of the present invention.

Referring to FIG. 3, the optical fiber coating apparatus of the present invention includes a coating unit 10 having a through hole 12 at its center to stick a coating agent 11 around an optical fiber passing through the through hole 12, a base 20 coupled with a lower portion of the coating unit 10 and having a discharge hole 21 communicated with the through hole 12 to draw out an optical fiber 60 having a coating layer, a cover 30 installed to an upper portion of the coating unit 10 to isolate the coating unit 10 from an external air and having a gas inlet 31, a coating agent outlet 32 and an optical fiber introduction hole 41, and a gas supply line 51 and a coating agent discharge line 52 respectively connected to the gas inlet 31 and the coating agent outlet 32.

Since the through hole 12 through which the drawn optical fiber 60 pass is formed at the center of the coating unit 10, the coating agent 11 filled in the through hole 12 is stuck to the surface of the optical fiber 60 when the optical fiber 60 passes the coating unit 10 through the through hole 12.

The base 20 is provided with the discharge hole 21 of a predetermined diameter communicated with the through hole 12 so that surplus coating agent 11 stuck to the surface of the optical fiber 60 is removed to control thickness of the coating layer of the optical fiber 60. In addition, the coating agent 11 is supplied from outside through a coating agent supply tube (not shown) connected to one side of the base 20 and is then ejected above the coating unit 10 along the through hole 12.

The cover 30 is coupled with the base 20 to intercept introduction of an external air into the coating unit 10 from outside, and it is installed to form positive pressure circumstance around the optical fiber 60 introduced through the optical fiber introduction hole 41 with the use of gas having lower kinetic viscosity than the air. In addition, the gas supply line 51 and the coating agent discharge line 52 respectively connected to the gas inlet 31 and the coating agent outlet 32 are installed to one side of the cover 30. The cover 30 preferably has a hemispherical shape, but it may have any shape that can isolate the coating unit 10 from outside.

The cover 30 is preferably made of transparent material so that a user may observe status of the optical fiber 60 introduced into an inner space 42 and a point where the optical fiber 60 comes in contact with the coating agent 11. Preferably, the cover 30 is made of glass or transparent plastic.

The gas supply line 51 supplies gas having lower kinetic viscosity than the air into the inner space 42 of the cover 30 through the gas inlet 31 so that positive pressure circumstance is formed around the introduced optical fiber 60 with the use of the gas having lower kinetic viscosity than the air. Then, though a drawing speed of the optical fiber 60 is increased, it is prevented that an external air is introduced into the inner space 42 through the optical fiber introduction hole 41, and also thickness of a boundary layer of the external air formed along the surface of the optical fiber 60 is reduced so that penetration of the external air into the meniscus portion may be easily intercepted, thereby preventing generation of bubble in the coating layer caused by introduction of the external air. The gas supplied through the gas inlet 31 may be Freon ($CCl_2F_2$), xenon (Xe), carbon dioxide ($CO_2$) and so on, but not limitedly.

The coating agent discharge line 52 is connected to the coating outlet 32 to discharge the coating agent 11, ejected above the coating unit 10 and collected in the bottom of the inner space 42, out of the coating device. Considering that the coating agent 11 has great viscosity, a vacuum means (not shown) such as a vacuum line is preferably connected to the coating agent discharge line 52 for the purpose of better discharge of the coating agent 11.

Meanwhile, if the coating agent outlet 32 is positioned at the same height as the gas inlet 31, the gas inlet 31 may be sunk in the coating agent 11, which may hinder good supply of the gas. Thus, it is preferred that the coating agent outlet 32 is formed relatively below the gas inlet 31 so that the coating agent discharge line 52 connected to the coating agent outlet 32 is connected relatively below the cover 30 in comparison to the gas supply line 51 connected to the gas inlet 31.

In addition, since the gas inlet 31 is formed below the cover 30 as shown in FIG. 3, the gas introduced into the inner space 42 of the cover 30 through the gas supply line 51 connected to the gas inlet 31 equally divides its pressure by a pressure equal division space 43 having a cylindrical shape around the coating layer, and then fills the inner space 42 of the cover 30.

Thus, the gas is not directly sprayed onto the surface of the optical fiber 60 introduced through the optical fiber introduction hole 41.

FIG. 4 is a schematic view showing the process of coating an optical fiber using the optical fiber coating apparatus according to a preferred embodiment of the present invention. Hereinafter, the optical fiber coating method using the coating apparatus of the present invention is described with reference to FIG. 4.

First, the coating apparatus of the present invention provided with the coating unit 10 and the cover 30 for isolating the coating unit 10 from an external air is prepared. Then, gas having smaller kinetic viscosity than the air is supplied into the inner space 42 of the cover 30 through the gas supply line 51 connected to the gas inlet 31 to form positive pressure circumstance in the inner space 42. In this state, the optical fiber 60 is introduced through the optical fiber introduction hole 41, and the optical fiber 60 passes through the through hole 12 filled with the coating agent 11. In addition, the coating agent 11 collected in the bottom of the inner space 42 is discharged out through the coating agent discharge line 52 connected to the coating agent outlet 32.

If a coating layer is formed on the optical fiber 60 in such a manner, thickness of the boundary layer of the external air formed along the surface of the optical fiber 60 is decreased so that the optical fiber 60 and the coating agent 11 are stably combined, and thus bubble is not formed in the coating layer.

Meanwhile, the gas injected into the inner space 42 of the cover 30 equally divides its pressure through the pressure equal division space 43 formed around the coating unit 10 as shown in FIG. 4, and then moves to the upper portion of the cover 30 into which the optical fiber 60 is introduced. In addition, the moved gas is partially discharged through the optical fiber introduction hole 41, but most of the moved gas is moved along the surface of the introduced optical fiber 60 to form positive pressure gas circumstance around the surface of the optical fiber 60 and then discharged Out together with the coating agent 11 through the coating agent outlet 32. In addition, since the inner space 42 of the cover 30 is kept at the positive pressure, introduction of an external air is intercepted. If the drawing speed of the optical fiber 60 is increased, an amount of air introduced into the optical fiber introduction hole 41 is increased. Thus, in older to keep the inner space 42 of the cover 30 at a positive pressure, it is preferred to increase the amount of gas.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, since gas is not directly sprayed on the surface of the optical fiber but the positive pressure circumstance is formed in the inner space of the coating apparatus using the gas having smaller kinetic viscosity than the air, thickness of an air layer formed along the surface of the optical fiber is decreased while the optical fiber is coated, so it may prevent generation of bubble in the coating layer of the optical fiber even during a high-speed drawing process and also it is possible to improve an optical fiber coating quality by stabilizing the coating conditions.

The invention claimed is:

1. An optical fiber coating apparatus, comprising:
   a coating unit for allowing an optical fiber to pass through and forming a coating layer on the optical fiber;
   a base coupled with a lower portion of the coating unit to draw the optical fiber;
   a cover installed to an upper portion of the coating unit to isolate the coating unit from an external air, the cover having an optical fiber introduction hole;
   a gas supply line for supplying gas, having smaller kinetic viscosity than the air, into an inner space formed by the cover; and
   a coating agent discharge line for discharging out a coating agent remained in the inner space of the cover,
   wherein the inner space forms positive pressure circumstance by using the gas having smaller kinetic viscosity than the air, and
   wherein the coating agent discharge line is connected to the cover at a relatively lower position than the gas supply line so as not to disturb gas supply into the inner space of the cover.

2. The optical fiber coating apparatus according to claim 1, wherein the gas introduced into the inner space of the cover is not directly sprayed on a surface of the optical fiber.

3. The optical fiber coating apparatus according to claim 1 or 2, wherein the coating agent discharge line is connected to the cover.

4. The optical fiber coating apparatus according to claim 1, wherein the gas supply line is connected to the cover.

5. The optical fiber coating apparatus according to claim 1, wherein the gas supply line is connected to a lower portion of the cover so that the gas supplied through the gas supply line equally divides its pressure through a pressure equal division space formed around the coating unit, and then the inner space is filled with the gas.

6. The optical fiber coating apparatus according to claim 1, wherein the gas is selected from the group consisting of Freon, xenon, carbon dioxide, and their mixtures.

7. The optical fiber coating apparatus according to claim 1, wherein the cover is made of transparent material so that the optical fiber introduced into the inner space of the cover is observable from outside.

8. The optical fiber coating apparatus according to claim 7, wherein the transparent material is glass or transparent plastic.

9. The optical fiber coating apparatus according to claim 1, further comprising:
   a vacuum means connected to the coating agent discharge line so as to improve a coating agent discharging force.

* * * * *